United States Patent
Chen et al.

(10) Patent No.: US 6,823,222 B2
(45) Date of Patent: Nov. 23, 2004

(54) PORTABLE PROCESSOR-BASED SYSTEM

(75) Inventors: Clark Chen, Portland, OR (US); Philip White, Portland, OR (US); Masahito Cho, Portland, OR (US); Stephen R. Brown, Portland, OR (US); Steven Rodden, Sherwood, OR (US); Richard Jeli, Milwaukie, OR (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 09/870,185

(22) Filed: May 30, 2001

(65) Prior Publication Data

US 2002/0183862 A1 Dec. 5, 2002

(51) Int. Cl.$^7$ .................................. G05B 15/00
(52) U.S. Cl. ...................... 700/83; 700/17; 345/184
(58) Field of Search ................ 700/17, 83; 345/156, 345/184

(56) References Cited

U.S. PATENT DOCUMENTS

| | | | | | |
|---|---|---|---|---|---|
| D367,890 S | * | 3/1996 | Osterhout | .................. | D21/329 |
| D376,822 S | * | 12/1996 | Osterhout | .................. | D21/329 |
| 5,825,353 A | * | 10/1998 | Will | ........................... | 345/184 |
| 6,278,442 B1 | * | 8/2001 | Griffin et al. | ............... | 345/169 |
| D450,687 S | * | 11/2001 | Batson et al. | .............. | D14/240 |
| 6,392,640 B1 | * | 5/2002 | Will | ........................... | 345/184 |
| 6,431,548 B1 | * | 8/2002 | Voigt et al. | ................. | 273/284 |
| 6,489,950 B1 | * | 12/2002 | Griffin et al. | ............... | 345/168 |

* cited by examiner

*Primary Examiner*—Anthony Knight
*Assistant Examiner*—Ronald D Hartman, Jr.
(74) *Attorney, Agent, or Firm*—Trop, Pruner & Hu, P.C.

(57) ABSTRACT

A portable processor-based system may include a display that is controlled by a scroll wheel. The scroll wheel extends completely through the display housing so that it can be manipulated between the thumb and forefinger of the user. This scrolling operation may be done at the same time the display itself is held in the user's hand.

9 Claims, 5 Drawing Sheets

PORTABLE PROCESSOR-BASED SYSTEM

BACKGROUND

This invention relates generally to processor-based systems and particularly to so-called portable or battery-powered processor-based systems.

A web tablet is a portable processor-based system that enables wireless access to the Internet. The web tablet can be moved about a building, such as a house, to enable web interaction at locations not typically occupied by processor-based systems such as desktop computers. For example, a user may access the Internet from a kitchen or a living room through the web tablet.

The web tablet may include a wireless link, such as a radio frequency link, to a base station that may be, for example, a desktop computer. The user can view information at essentially any location reasonably proximate to the base station. For example, web tablets may be used to view information from the Internet, to accomplish instant messaging or chat sessions or even desk top functions to mention a few examples. The web tablet may interact with other appliances such as televisions. For example, a television program may have an associated Internet web page and that page may be viewed at the same time the television program is being watched. Also, the web tablet may be used like a remote control to control appliances.

Since web tablets generally have either no keyboards or only a limited keyboard, it is important that other controls be highly functional. Thus, there is a need for better ways to control the display of information on portable processor-based systems such as web tablets.

DETAILED DESCRIPTION

Figure 1:
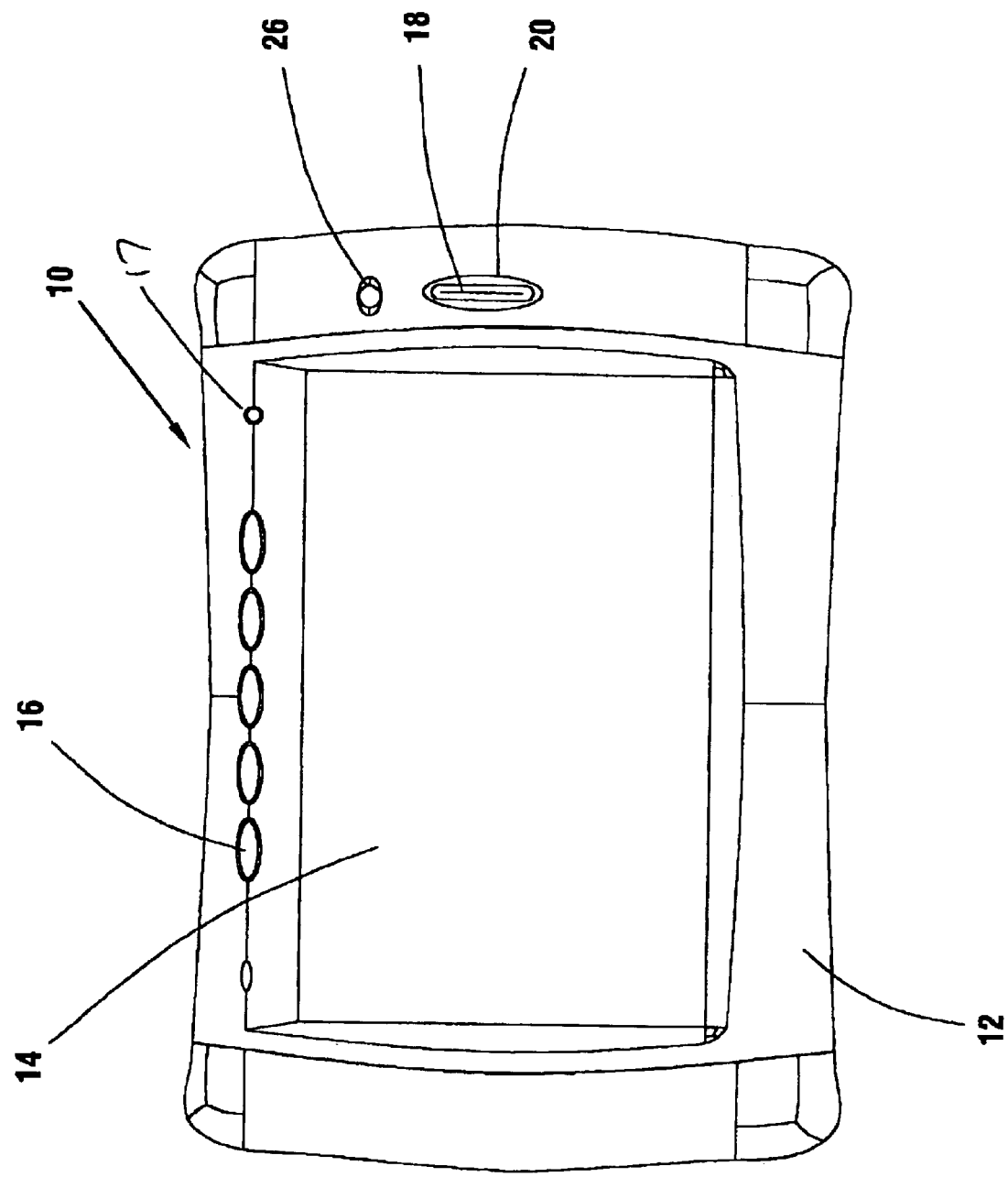
FIG. 1 is a front view of one embodiment of the present invention.

Referring to FIG. 1, a portable processor-based system 10 may include a housing 12, a display screen 14 and plurality of fast-on buttons 16. In one embodiment of the present invention, the portable processor-based system 10 is a web tablet that enables wireless access to the Internet through a base station (not shown in FIG. 1). The housing 12 may be generally book-shaped and may be dominated by the display screen 14 and a peripheral housing portion 12 including control devices such as an instant print button 17, a forward and backward rocker 26 and a vertical scroll wheel 18.

The vertical scroll wheel 18 is essentially a roller wheel that may be rotated to move the displayed information up and down on the display screen 14. This is particularly useful when an entire web page can only be shown in part on the display screen 14. In such case, the web page must be scrolled in order to view all the information.

The fast-on button 16 allows the system 10 to be immediately activated to a start page that is selectably programmable by the user. Thus, a variety of different web pages may be selected through any of the buttons 16.

Similarly, the button 17 allows the currently displayed screen display to be printed. The rocker switch 26 allows the user to rock the switch to the left or right to go forward to the next page or backward to the previous web page being viewed.

Figure 2:
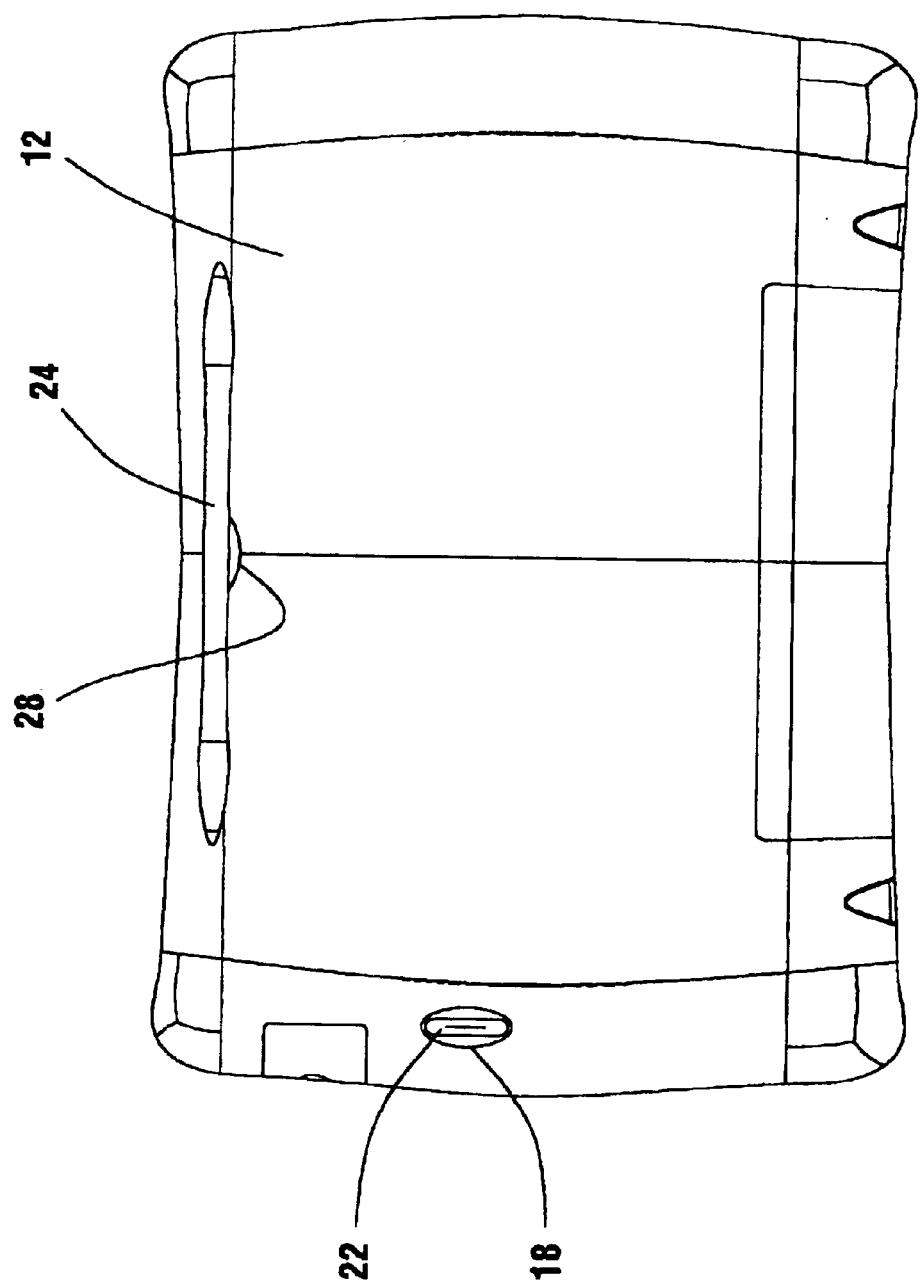
FIG. 2 is a back view of the embodiment shown in FIG. 1.

Referring next to FIG. 2, the backside of the housing 12 may include a stylus 24 mounted magnetically on the housing 12. The wheel roller 18 extends through a depression 22 on the backside of the housing 12. The same wheel 18 extends through the depression 20 on the front side of the housing 12, as shown in FIG. 1.

The stylus 24 may be utilized to handwrite on the display screen 14. Handwriting analysis technology may be utilized to receive the handwriting as an input signal to the system 10.

Figure 4:
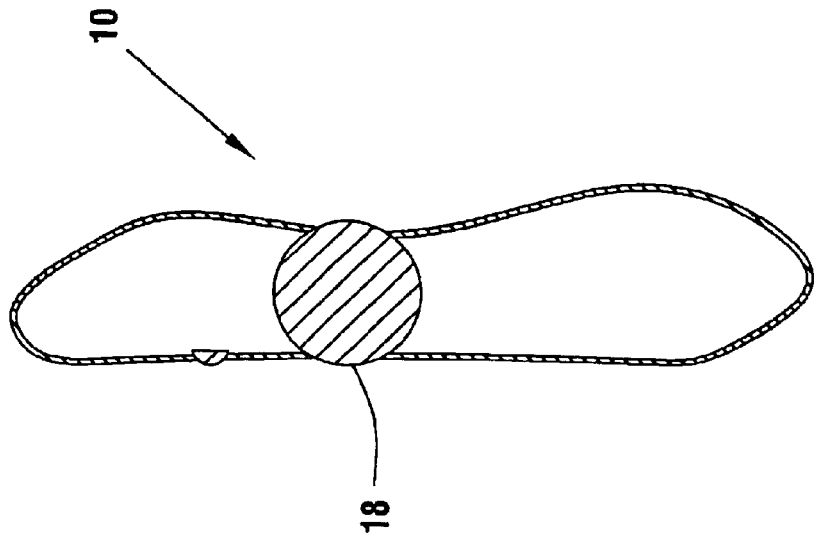
FIG. 4 is a cross-sectional view taken generally along the line 4—4 in FIG. 1.
Figure 3:
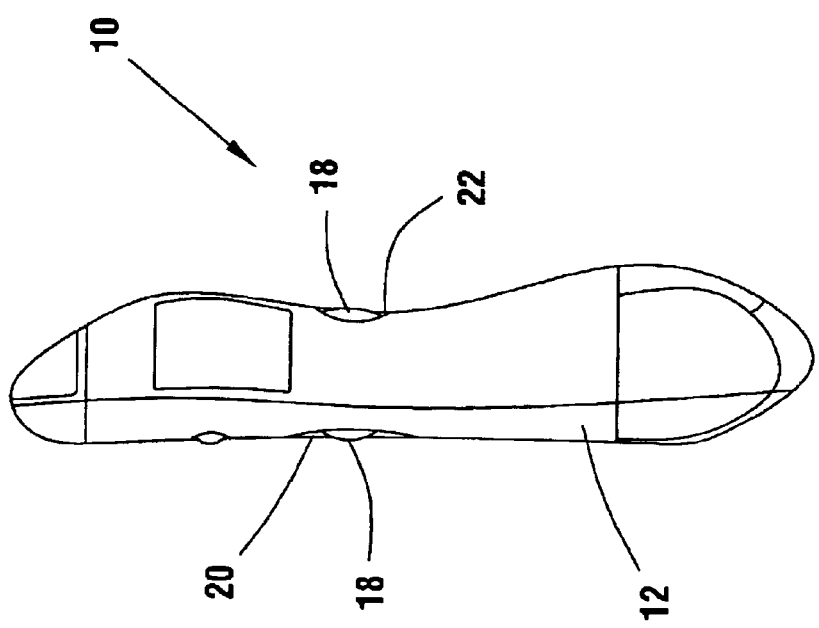
FIG. 3 is a right side view of the embodiment shown in FIG. 1.
Figure 5:
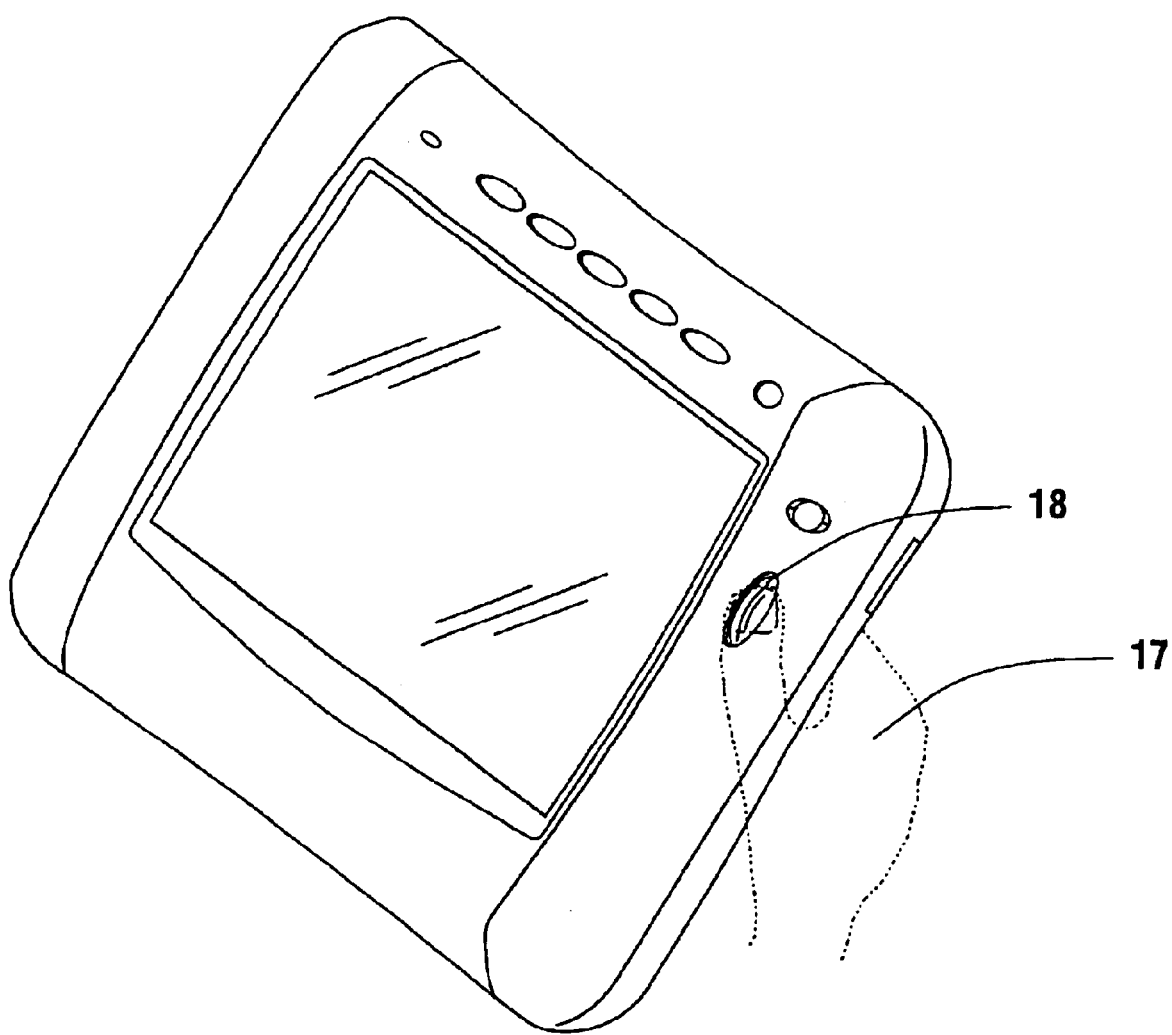
FIG. 5 is a perspective view of the embodiment shown in FIG. 1 in use.

As shown in FIG. 3, the scroll wheel 18 extends through the depressions 20 and 22 on opposite sides of the housing 12. Thus, the wheel 18 may be manipulated between the user's thumb and forefinger from both sides of the housing 12 around the rightmost edge of the housing as depicted in FIG. 5. As shown in FIG. 4, the wheel 18 extends completely through the housing 12.

Thus, as shown in FIG. 5, the user may grasp the right side of the device 10 with the user's thumb over the wheel 18 on the display side of the housing 12 and the user's forefinger over the wheel 18 on the backside of the housing 12. In this way, the user can skillfully manipulate the display up and down by the coordinated movement between the user's thumb and forefinger. No extra effort is required because the user must hold the system 10 in the user's hand A in substantially this position in any case.

Figure 6:
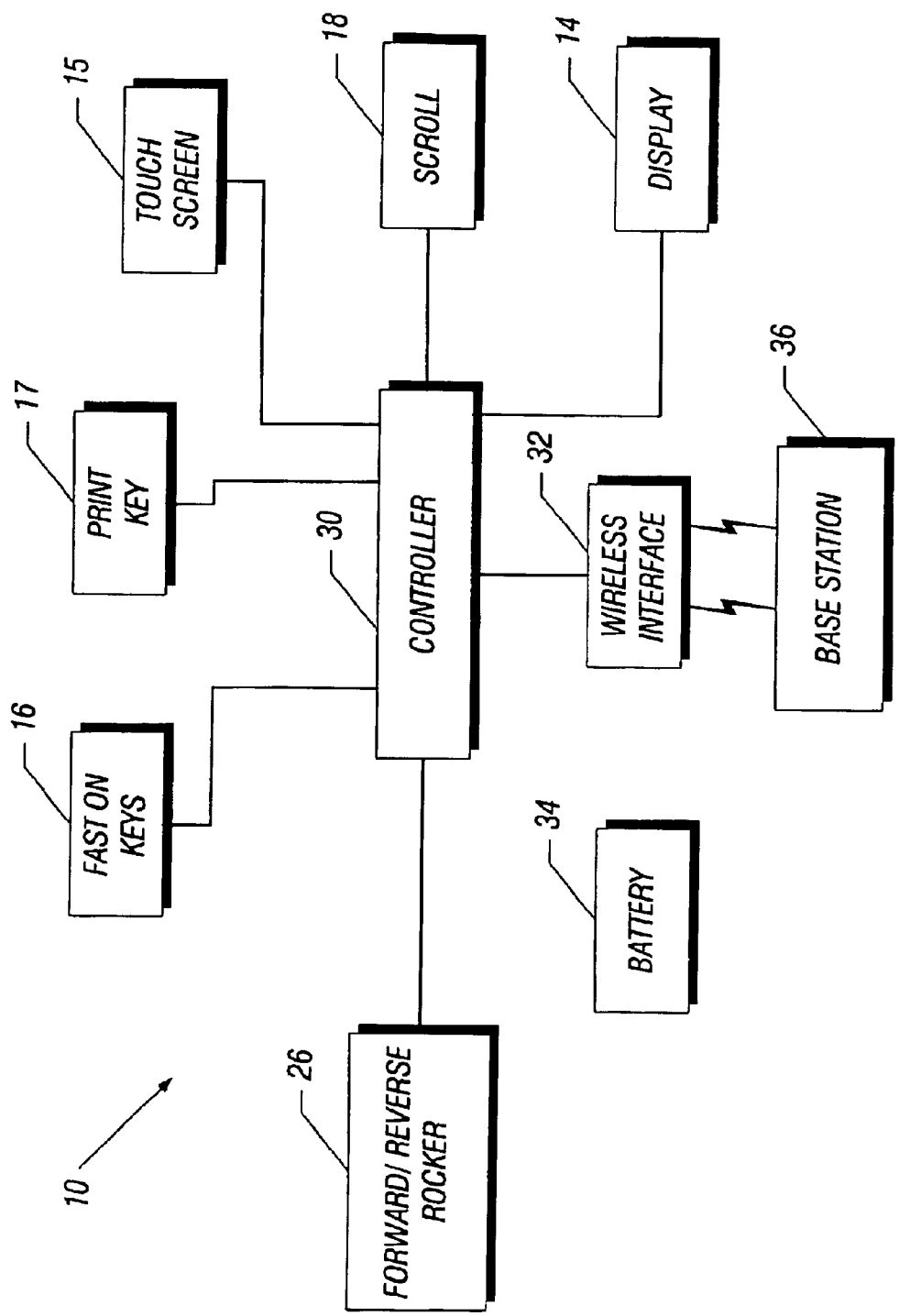
FIG. 6 is a block depiction of one embodiment of the present invention.

Referring to FIG. 6, the system 10 may include a controller or other processor-based device 30. The controller 30 may be coupled to the fast-on buttons 16, the print button 17, the scroll wheel 18, a display 14, a touch screen input device 15 and the forward and reverse rocker 26. In addition, the controller 30 may be coupled to a wireless interface 32. A battery 34 may be provided. The wireless interface 32 allows the system 10 to communicate with a base station 36 which may be another processor-based system such as a desktop computer, a set-top box, a processor-based appliance or any other processor-based system. The communication may be by a suitable radio frequency protocol including a cellular telephone link, a Bluetooth link (see Bluetooth Specification, Version 1, Dec. 1, 1999), an 802.11 Wireless LAN Standard (Institute of Electrical and Electronics Engineers, 1999, New York, N.Y.) link, or other wireless protocols. In addition, an infrared communication protocol may be used as well.

In some embodiments, the system 10 may also interact with an appliance such as a television. Infrared ports (not shown) on the system 10 may be used to remotely control appliances. Also the system 10 may include a microphone and speaker (not shown) to act as a telephone as well.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A portable processor-based system comprising:

a housing having top and bottom sides;

a display formed in said housing; and a scroll wheel to control said display, said wheel extending through the top and bottom sides of said housing.

2. The system of claim 1 wherein said system is a web tablet.

3. The system of claim 2 wherein said web tablet is a wireless web tablet.

4. The system of claim 1, said scroll wheel to scroll said display up and down.

5. The system of claim 1 wherein said housing has edges around said opposed top and bottom sides, said wheel is positioned near an the edge of said housing such that said scroll wheel may be manipulated between a user's thumb and forefinger.

6. The system of claim 5 wherein said scroll wheel is positioned so that the scroll wheel may be manipulated by the user's thumb and forefinger at the same time that the user's hand holds the system.

7. A method comprising:

providing a housing having top and bottom sides;

providing a display in said housing; and providing a scroll wheel that extends completely through the top and bottom sides to be manipulated between a user's thumb and forefinger at the same time the housing is held in a user's hand.

8. The method of claim 7 including providing an Internet connection.

9. The method of claim 7 including scrolling said scroll wheel between the user's thumb and forefinger to adjust the display vertically.

\* \* \* \* \*